(12) United States Patent
Kumar et al.

(10) Patent No.: US 9,774,587 B2
(45) Date of Patent: Sep. 26, 2017

(54) MOBILE APPLICATION BASED ACCOUNT AGGREGATION

(71) Applicant: Yodlee, Inc., Redwood City, CA (US)

(72) Inventors: Kirti Kumar, San Jose, CA (US); Vinay Nagaraj, San Jose, CA (US)

(73) Assignee: Yodlee, Inc., Redwood City, CA (US)

( * ) Notice: Subject to any disclaimer, the term of this patent is extended or adjusted under 35 U.S.C. 154(b) by 16 days.

(21) Appl. No.: 14/853,023

(22) Filed: Sep. 14, 2015

(65) Prior Publication Data

US 2017/0078259 A1   Mar. 16, 2017

(51) Int. Cl.
  *H04L 9/32*    (2006.01)
  *H04L 29/06*   (2006.01)
  *H04W 12/06*   (2009.01)
  *G06Q 40/02*   (2012.01)

(52) U.S. Cl.
  CPC .............. *H04L 63/08* (2013.01); *G06Q 40/02* (2013.01); *H04W 12/06* (2013.01)

(58) Field of Classification Search
  CPC ......... H04L 63/08; H04L 63/10; G06F 21/31; G06F 21/35; G06F 21/6245; H04W 12/00; H04W 12/06; H04W 12/08
  USPC .............................. 726/2–7, 27–29; 713/168
  See application file for complete search history.

(56) References Cited

U.S. PATENT DOCUMENTS

| | | | |
|---|---|---|---|
| 7,620,912 B1 | 11/2009 | Benson | |
| 8,321,672 B2* | 11/2012 | Asano | H04L 9/3273 713/156 |
| 8,533,857 B2* | 9/2013 | Tuchman | H04L 63/104 705/304 |
| 8,887,232 B2* | 11/2014 | McKay | H04L 9/3231 726/2 |
| 8,959,608 B2* | 2/2015 | Ahmed | H04W 12/06 726/10 |
| 8,973,102 B2* | 3/2015 | Jakobsson | G06F 21/33 713/155 |
| 2003/0204460 A1 | 10/2003 | Robinson et al. | |
| 2004/0267665 A1 | 12/2004 | Nam et al. | |

(Continued)

OTHER PUBLICATIONS

International Search Report and Written Opinion received in International Patent Application No. PCT/US2016/051324, filed Sep. 12, 2016. Received Dec. 20, 2016. 16 pages.

*Primary Examiner* — Hosuk Song
(74) *Attorney, Agent, or Firm* — Fish & Richardson P.C.

(57) ABSTRACT

Methods, systems, and apparatus, including computer programs encoded on a computer storage medium, for automating the collection of user information for account aggregation. In one aspect, a method includes receiving, at a server computer system from a mobile device of a user, a first user request to access account information; receiving, at the server computer system from a provider computer system, a plurality of mobile device applications; for each respective establishment of the plurality of establishments: storing, at the server computer system, establishment login credentials of the user to access account information of the user at a computer system of the respective establishment, and obtaining account information of the user at the respective establishment; aggregating, on the computer system, all the account information of the user from the respective mobile device application of each establishment; and providing to the mobile device the aggregated account information of the user.

36 Claims, 5 Drawing Sheets

(56) References Cited

U.S. PATENT DOCUMENTS

2009/0193433 A1 7/2009 Maes
2012/0203733 A1 8/2012 Zhang

* cited by examiner

MOBILE APPLICATION BASED ACCOUNT AGGREGATION

BACKGROUND

This specification relates to automating the collection of user information for account aggregation.

As the Internet has grown in popularity, more users are turning to services provided over the Internet. These services are provided by various institutions, e.g., financial institutions, on-line retailers, or web-service providers. Users typically setup an account with the various establishments. From the webpage(s), the user accesses banking, investment, retail, content service providers, e-mail, and other online services. Account aggregators compile information from different accounts of the user at different establishments and present the compiled information to the user in one place. Each account can be with a different establishment. Aggregating information from different accounts of the user at different establishments via the webpage(s) of the establishment typically involves extracting irrelevant metadata along with the account information data from the webpage(s) and having to update scripts to adapt to regularly updated webpage(s).

SUMMARY

In general, one aspect of the subject matter described in this document can be embodied in a method that includes receiving, at a server computer system from a mobile device of a user, a first user request to access account information from a plurality of establishments; receiving, at the server computer system from a provider computer system, a plurality of mobile device applications, each mobile device application associated with a respective establishment of the plurality of establishments; storing, at the server computer system, the plurality of mobile device applications; for each respective establishment of the plurality of establishments: storing, at the server computer system, establishment login credentials of the user to access account information of the user at a computer system of the respective establishment, and obtaining account information of the user at the respective establishment, by running the respective mobile device application of the respective establishment on the server computer system, and using the stored establishment login credentials of the user to access the computer system of the respective establishment; aggregating, on the computer system, all the account information of the user from the respective mobile device application of each establishment of the plurality of establishments; and providing to the mobile device the aggregated account information of the user.

These and other embodiments can optionally include one or more of the following features. The first user request can include server login credentials of the user to access a respective user profile on the server computer system. The method can further include associating, at the server computer system, the respective establishments with the respective user profile; receiving, from the mobile device of the user, a second user request to access account information of the user for a new establishment, wherein the respective user profile does not include an association with the new establishment; storing, at the server computer system, a mobile device application associated with the new establishment; and associating, at the server computer system, the new establishment with the respective user profile.

Running the respective mobile device application can include running a script that corresponds to the respective mobile device application, wherein the script executes a plurality of events that causes the mobile device application to generate a mobile device webpage; receiving the mobile device webpage from the computer system of the respective establishment; and extracting information from the mobile device webpage of the respective establishment.

The establishment login credentials can include a user identifier and a token. The establishment can be a financial institution and the account information can include information describing scheduled payments, account balance, or past transactions of the user at the respective establishment. The account information of the user at the respective establishment can include information from multiple types of accounts of the user at the respective establishment. The account information of the user at the respective establishment can include information from multiple types of accounts of the user at the respective establishment. The user request can include a device ID that identifies the mobile device of the user to the server computer system.

In general, in another aspect of the subject matter described in this document can be embodied in a method that includes receiving, at a server computer system from a mobile device of a user, a first user request to access account information from a plurality of establishments; receiving, at the server computer system from a provider computer system, a plurality of mobile device applications, each mobile device application associated with a respective establishment of the plurality of establishments; storing, at the server computer system, the plurality of mobile device applications; for each respective establishment of the plurality of establishments: storing, at the server computer system, establishment login credentials of the user to access account information of the user at a computer system of the respective establishment, and obtaining account information of the user at the respective establishment, by accessing a mobile application programming interface of the respective establishment, and using the captured establishment login credentials of the user to access the computer system of the respective establishment; aggregating, on the computer system, all the account information of the user from the plurality of establishments; and providing to the mobile device the aggregated account information.

Additionally, in another aspect of the subject matter described in this document can be embodied in a method that includes receiving, at the server computer system from a mobile device of a user, establishment login credentials of the user to access account information of the user from an establishment; storing, at the server computer system, a mobile device application that is associated with the establishment; running, at the server computer system, the mobile device application of the establishment; providing the mobile device application the establishment user login credentials; capturing, from the mobile device application, a sequence of events within the mobile device application that include one or more triggering events within the mobile device application; and generating a script that navigates the mobile device application of the establishment based on the sequence of events.

Moreover, in another aspect of the subject matter described in this document can be embodied in a method that includes storing, at the computer system, a mobile device application associated with establishment; receiving, at the server computer system from a plurality of mobile devices, each mobile device associated with a respective user of a plurality of users, user requests to access account information for the plurality of users at the establishment; running, at the server computer system, a plurality of instances of the mobile device application, wherein each instance of the mobile device application is associated with a respective mobile device of the plurality of mobile devices; for each respective user of the plurality of users: capturing, at the server computer system, establishment login credentials of the respective user to accesses account information of the respective user at a computer system of the establishment, and obtaining account information for each respective user using the captured establishment login credentials of the respective user to access the computer system of the establishment; and providing to the plurality of mobile devices, the account information of the respective user associated with the mobile device.

Other embodiments of this aspect include corresponding systems, apparatus, and computer programs encoded on computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The subject matter described in this specification can be implemented in particular embodiments so as to realize one or more of the following advantages. An account aggregation system obtains information from multiple establishment computer systems that contains account information of the user without the metadata associated with webpage(s). Access to account information without the metadata associated improves the accuracy and efficiency of extracting the account information from the received information from the establishment computer system. The account aggregation system also does not need to regularly adjust to modifications in an establishment's website to obtain user account information at the establishment. Additionally, the account aggregation system can determine when to update the script that aggregates and extracts account information of the user from the establishment computer system based on an update notification from a mobile device application provider system. Moreover, the account aggregation system can reduce latency in obtaining and aggregating account information from multiple establishments.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
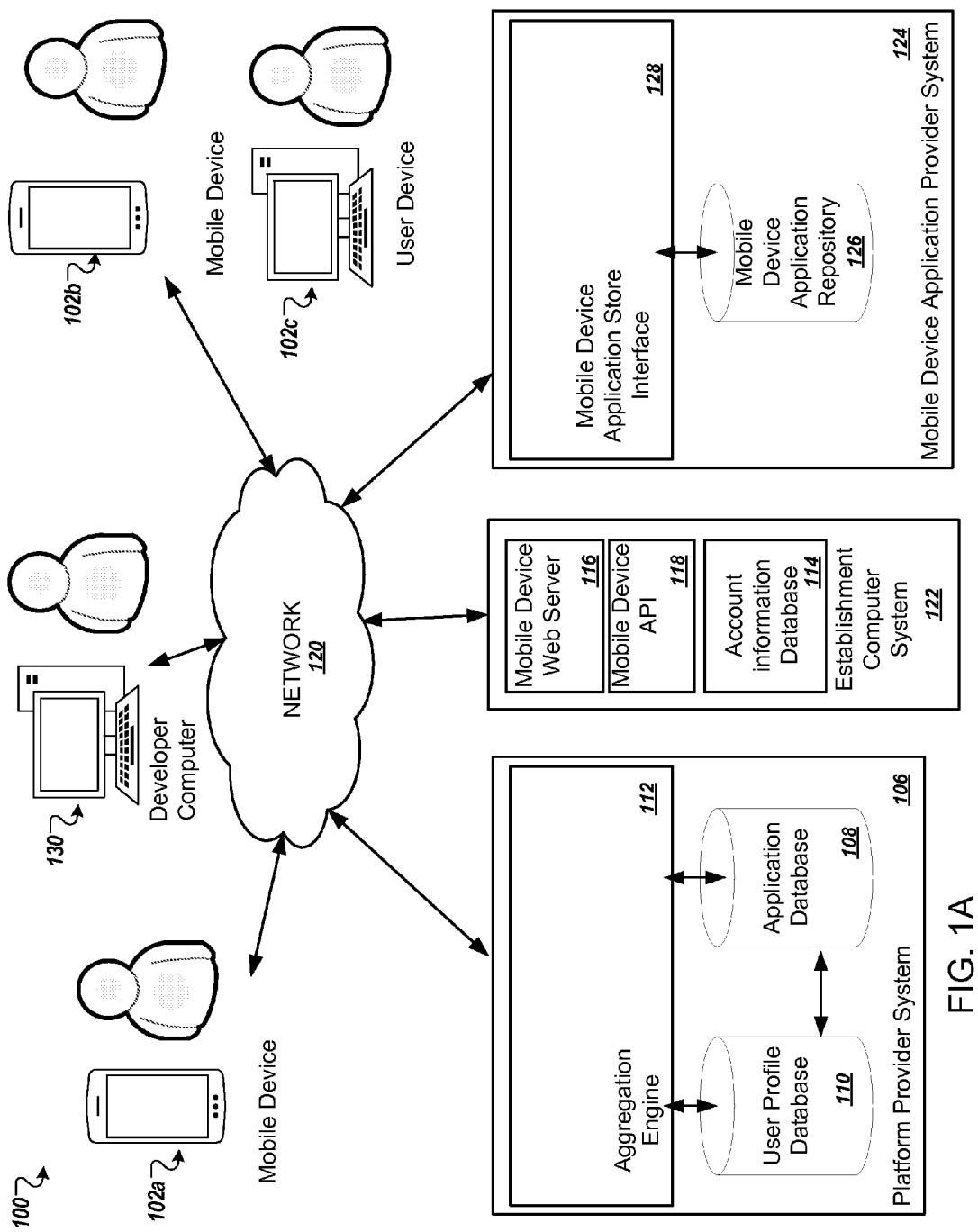
FIG. 1A shows an example account aggregation system.

FIG. 1A shows an example account aggregation system. The account aggregation system 100 is an example of a system implemented as one or more computer programs on one or more computers in one or more locations, in which the systems, components, and techniques described below, are implemented.

The account aggregation system 100 includes a platform provider system 106, e.g., account aggregator software on a server computer system that processes user requests to access account information for different establishments. Establishments can be, for example, a financial institution, e.g., Bank of America®, an on-line retailer, e.g., Amazon®. Examples of financial institutions include banks, brokerage firms, credit card companies, credit unions, and savings and loans. A user can have multiple accounts of different types at multiple establishments. For example, at a financial institution, a user can have an investment account, a checking account, a savings account, a credit card, a mortgage, or a line of credit.

A user can have different types of account information at one or more establishments. At a financial institution, types of account information include, for example, balance information, payee information, account holder information, transaction information, and financial institution information. Balance information can include a current balance in the account, an amount of principal remaining or paid, or an amount of interest or dividend paid. The balance information can be for a specified period, for example, a year-to-date, quarterly, or semiannual information. Payee information can include, for example, names, addresses, payee account number, payment date, or an amount paid. Account holder information can include, for example, name, address, or account number of the account holder. Transaction information includes past transaction history and scheduled payments. Financial institution information can include, for example, a financial institution routing number, address, or other designations identifying the financial institution.

The account aggregation system 100 includes a platform provider system 106 that runs one or more applications that provide various services to users, including account aggregation and presentation of collected information. The platform provider system provides these services directly to a user either on its own behalf or on behalf of a financial institution.

The platform provider system 106 can receive user requests from one or more users on one or more devices, e.g., mobile devices 102a or 102b or user device 102c, of the system across a data communication network 120 to access the establishment computer system 122. A mobile device 102a or 102b can include, for example, a smartphone, a tablet, or a smartwatch. The user device 102c can include, for example, a desktop computer, laptop computer, smartphone, tablet, or smartwatch The data communication network 120 connects a user on a mobile device 102a or 102b or user device 102c with the platform provider system 106 and connects the platform provider system 106 to the computer systems of the different establishments, e.g., establishment computer system 122. In some implementations, the platform provider system 106 receives the user requests from another supported channel, e.g., a web or application programming interface. The data communication network 120 also connects the platform provider system 106 to the computer system of a mobile device application provider system 124, e.g, Google Play® or Apple iTunes®, and optionally to one or more developer computers 130. Each mobile device 102a or 102b, platform provider system 106, establishment computer system 122, can include one or more computing devices. The platform provider system 106 and the establishment computer system 122 can be the same computer system. In some implementations, the establishment computer system 122 can also be the same system as the mobile device application provider system 124. The network 120 can include wired and/or wireless connections, and can be a local area network (LAN) or wide area network (WAN), e.g., the Internet, or a combination of networks.

The mobile device application provider system 124 offers for download one or more applications that are operable on the mobile device 102a or 102b of a user to access account information on the establishment computer system 122. Typically, such applications are developed and authorized for posting on the mobile device application provider system 124 by the establishment that operates the establishment computer system 122. A user can download an application onto the mobile device 102a or 102b, and run the application on the mobile device 102a or 102b to access account information from the establishment computer system 122.

Regardless of whether a user downloads an application, a user can access and request account information through an interface provided by the platform provider system 106. The mobile device 102a or 102b can present a user interface through, for example, a computer program that presents data, e.g., text and images, in a format specified by the platform provider system 106. In some implementations, the user interface is presented in a web browser or a mobile device application.

The platform provider system 106 includes an aggregation engine 112 that processes the user request to access account information. Generally, a user request to access account information is a request to access and collect account information from a computer system of an establishment where a user has an account. For example, the user request to access account information can be a request to view payment or transaction history at a particular establishment, e.g., order and payment history, mortgage payments, check payments, investment trades, or credit card transactions and payments. As another example, the user request can be a request to view account or statement balance information. As another example, the user request can be a request to make a payment, transfer money from one account to another, or view a transaction record. The aggregation engine 112 processes different types of user requests for different account types, e.g., user requests to display account balance information for a checking account and user requests to view order history for an investment account or an on-line retail account.

The platform provider system 106 maintains a user profile database 110 that includes one or more user profiles. A user signs into the platform provider system 106, e.g., by providing a user name and password, to request access to account information. The platform provider system 106 uses the user profile database 110 to store and maintain information about each user including server login credentials for the platform provider system 106. The server login credentials include a username and password. Login credentials are unique and correspond to a respective user profile. The user profile database 110 identifies a user profile for a user based on the server login credentials. The user profile database 110 stores and maintains information about each user including, for example, server login credentials, associations between the user and establishments having an account of the user, and establishment login credentials for the associated establishments. For example, the user profile database 110 can store and maintain an association between a user, "John Doe," and a financial institution, "Bank ABC," that indicates that "John Doe" has an account at "Bank ABC." The association between the user and establishment can include information on the type of accounts that the user has at the establishment. For example, "John Doe" can have a checking account and a savings account at "Bank ABC." The user profile also stores the establishment login credentials for the each establishment associated with the user. Establishment login credentials include a username and password to access the account information database 114 on the establishment computer system 122.

The platform provider system 106 includes an application database 108 that stores multiple different mobile device applications. Each mobile device application is associated with a respective establishment. The aggregation engine 112 uses the information in the user profile database 110 that indicates an association between the user and an establishment to determine the instances of the mobile device application from the application database 108 to instantiate within the platform provider system 106. An example of the platform provider instantiating multiple instances of different mobile device application is illustrated in more detail below with reference to FIG. 1B.

The platform provider system 106 obtains mobile device applications to store in the application database 108 from the mobile device application provider system 124. The process of obtaining the mobile device application from the mobile device application provider system 124 is not exposed to the user on a mobile device 102a or 102b. The mobile device application is preloaded and stored in the application database 108 from the mobile device application provider system 124.

The mobile device application provider system 124 includes a mobile device application repository 126 that includes the mobile device applications of different establishments. A developer or administrator interacts with a mobile device application store interface 128 to download one or more mobile device applications from the mobile device application repository 126 onto a computer readable medium, e.g., a compact disk, flash drive, or hard drive, to transfer to the platform provider system 106.

The aggregation engine 112 accesses account information at an establishment computer system 122. The aggregation engine 112 can access the establishment computer system 122 through an instance of the mobile device application of the establishment through a web server, e.g., mobile device web server 116, that runs on the establishment computer system 122. In other implementations, the aggregation engine 112 can access the establishment computer system 122 through an instance of the mobile device application of the establishment through an application programming interface, e.g., mobile device application programming interface 118, of the establishment computer system 122. In other implementations, the aggregation engine runs proprietary software that directly accesses the establishment computer system through an application programming interface, e.g., mobile device application programming interface 118, of the establishment computer system 122. Other implementations for the aggregation engine 112 to access account information on an establishment computer system 122 include a public OFX feed between the platform provider system 106 and the establishment computer system 122. A public OFX feed is a stream of financial data sent to another computer, for example, over the Internet, by a computer system of one or more financial institutions. The establishment computer system 122 can store the account information of the user in an account information database 114.

The aggregation engine 112 receives from a developer's computer 130 a script that sends commands to the establishment computer system 122 to navigate a mobile device interface screen, e.g., mobile device web page, of the establishment computer system or interact with the application programming interface of the establishment computer system 122 to obtain the account information of the user. The script can emulate actions by a user. The scripted actions can be provided to an instance of the mobile device application running on a device emulator, which then contacts the establishment computer system 122 to access and obtain account information data.

The aggregation engine 112 extracts and aggregates the account information of the user from the obtained data from each of the establishment computer systems and provides the extracted account information data to the mobile device 102*a* or 102*b*.

Figure 1B:
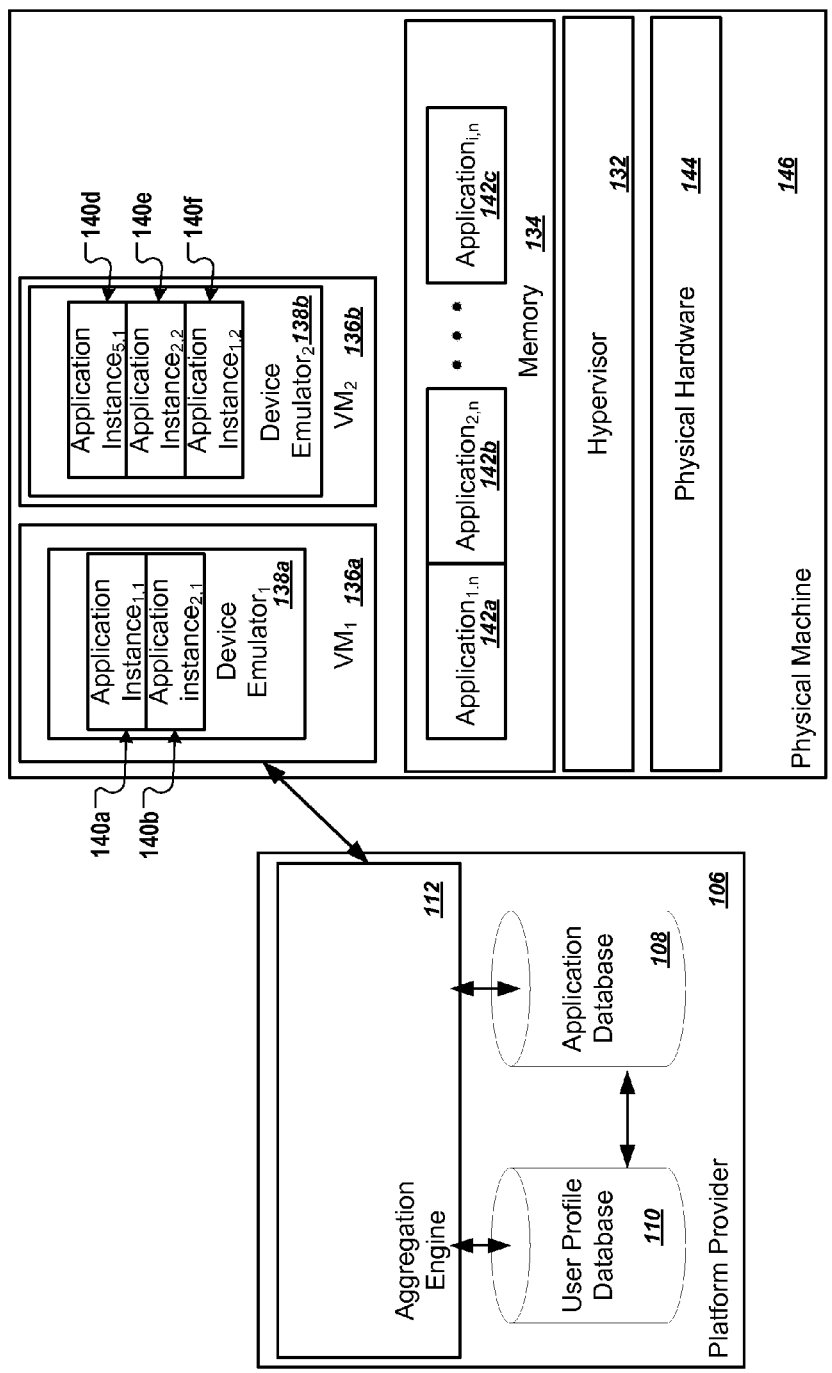
FIG. 1B shows an example platform provider system running multiple mobile device applications.

FIG. 1B shows the example platform provider system 106 running multiple mobile device applications. The platform provider system 106 implemented as computer programs, appropriately programmed on the one or more computers, processes the user request using the components and techniques described below.

For a user request, the platform provider system 106 uses virtual machines (VMs), e.g. virtual machines 136*a*-136*b*, to perform the user request. Each of the VMs 136*a*-136*b* executes on a physical machine 146, e.g., a server computer system. The physical machine includes physical hardware 144, for example, a processor (CPU), a memory management unit (MMU), and memory 134, e.g., Random Access Memory (RAM), hard disk, or flash memory. The physical machine includes a hypervisor 132. A hypervisor, e.g., hypervisor 132, is a virtualization software layer that resides on a hardware platform, e.g., physical hardware 144, of a physical machine, e.g., physical machine 146. Each of the VMs support an operating environment. An operating environment is a set of configurations, software applications, operating system, and other aspects of a software framework.

The aggregation engine 112 of the platform provider system 106 instantiates one or more VMs, e.g., VMs 136*a*-136*b*, executing on physical machine 146. The aggregation engine 112 loads an device emulator, e.g. device emulator 138*a* and 138*b*, on the VMs, e.g., VMs 136*a* and 136*b*, to run multiple instances of the mobile device applications of different establishments, e.g. instances of mobile device application 140*a*-140*f*.

Typically, a system administrator performing stress tests of a server that runs at the establishment computer system for testing of a mobile device application does not run multiple instances of different instances of mobile device application of multiple different establishments.

The application database 108 of the platform provider system 106 stores mobile device applications of multiple establishments, e.g. mobile device applications 142*a*-142*c*, in memory 134 on the physical machine 146.

Figure 2:
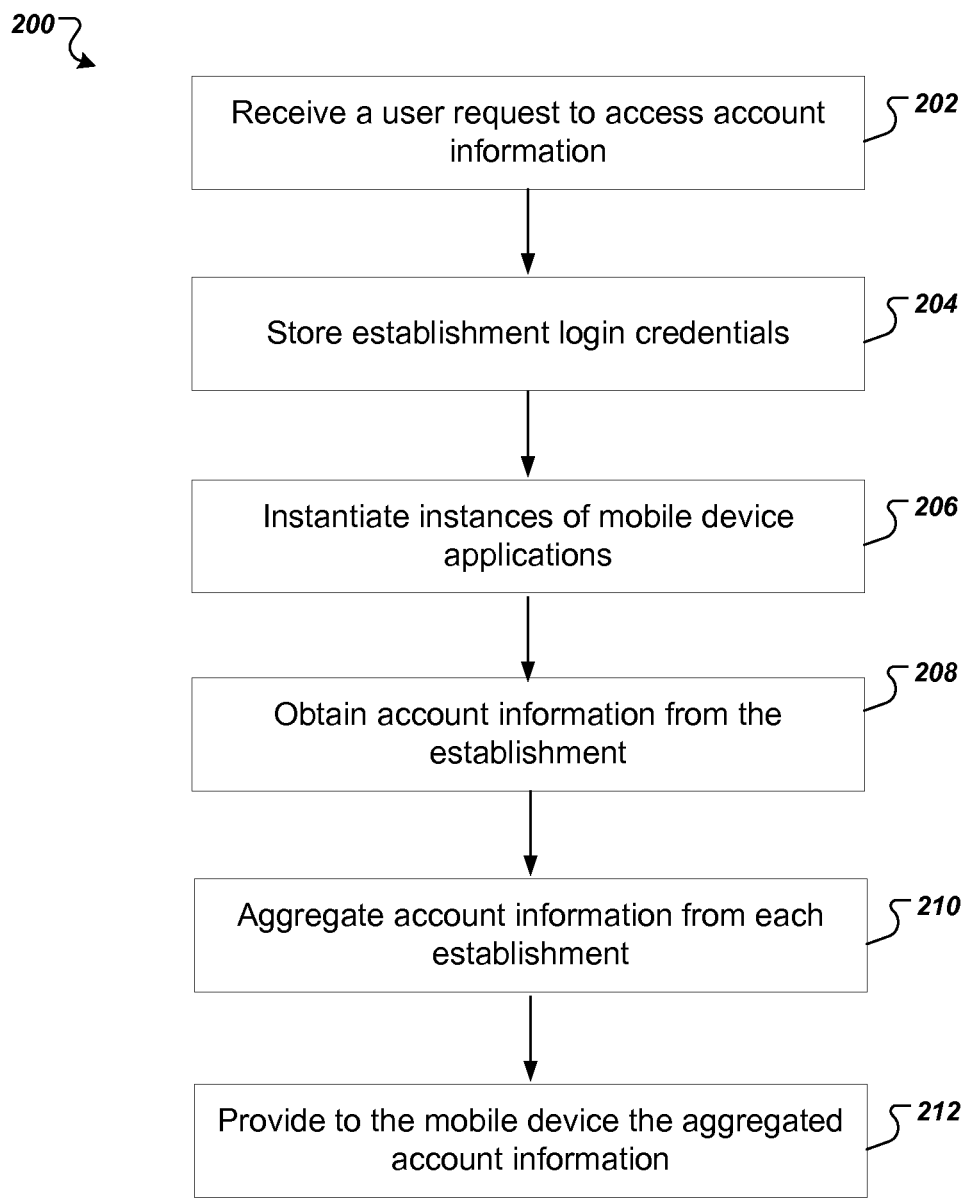
FIG. 2 is a flow diagram of an example process for providing aggregated account information.

FIG. 2 is a flow diagram of an example process 200 for providing aggregated account information to a mobile device of a user. The process 200 is performed by a system of one or more computers. For example, the platform provider system 106 of FIG. 1, appropriately programmed, can perform the process 200.

The system receives a user request (step 202). The user request includes information that identifies one or more establishments where the user has an account. For example, a user can indicate that the user has an account at a particular establishment by selecting the establishment from a list of establishments. A user can also indicate that the user has an account at a particular establishment by providing user input that identifies the particular establishment, e.g, inputting the name of the establishment into an input field. The user request can include establishment login credentials for the one or more identified establishments. In other implementations, the system provides to the client device a user interface that requests user login credentials for the account at the establishment. A user request can include information that identifies a mobile device, e.g., a device ID. The system associates an establishment with the user when the system receives an indication from the establishment computer system that the user has an account at the establishment.

The system stores the establishment login credentials for each of the one or more establishments associated with the user (step 204). The system can store the establishment login credentials in a user profile on the server computer system. The user profile includes an association between the establishment, the establishment login credentials for one or more accounts on the establishment computer system, and the user. In some implementations, the system receives the establishment login credentials for the one or more identified establishments along with the user input that identifies the one or more establishments associated with the user. In other implementations, the system provides an interface to the mobile device of the user that displays one or more fields for the user to input establishment login credentials for each identified establishment.

The system instantiates an instance of a mobile device application associated with each establishment associated with the user (step 206). The system identifies establishments associated with the user based on the user profile. The system instantiates each instance of a mobile device application by instantiating a virtual machine that runs an emulated device executing a mobile device application of one or more of the establishments associated with the user on the platform provider system. The sequence for running an instance of a mobile device application of an establishment is described in more detail below with reference to FIG. 3.

The system obtains from each establishment computer system account information of the user (step 208). The system uses the respective establishment login credentials for each establishment to access the account information of the user on the respective establishment computer system to obtain the account information of the user. The collection of the account information of the user can be in response to the user request. In other implementations, the collection of the account information of the user is not done in response to the user request. That is, the system can perform the collection of the account information of the user in advance and store the account information in a repository. When the user requests the account information, the system can search the repository to obtain the account information of the user.

The system accesses the respective establishment computer system by running the instance of the mobile device application of the respective establishment. In some implementations, the system runs a script that navigates through one or more mobile device user interface screens and extracts account information from the one or more mobile device user interface screens. The system uses the script to send commands to the mobile device webserver to navigate and screen-scrape each of the one or more mobile device user interface screens. The system scrapes data from each mobile device user interface screens by crawling the mobile device user interface screen. Data from each mobile device user interface screen includes metadata associated with the screen and account information data. The system can use pattern recognition techniques to extract the account information from the scraped data or the system can identify the account information from the scraped data using annotated identifiers or specific fields that indicate account information data. Thus, the system removes metadata and all other data not associated with the account information of the user to obtain the account information of the user. The system receives data from the establishment computer system that the system parses to extract account information from the received data. The system can associate the extracted account information with the user and store the extracted account information and association in a repository.

The system aggregates the obtained account information from each of the establishments (step 210). The system identifies and categorizes the account information. The system can categorize the account information by type, by establishment, by each respective account, or by a combination of type, establishment, or respective account.

The system provides the aggregated account information to the mobile device of the user (step 212). That is, the system generates a user interface that includes the aggregated account information and provides the user interface to the mobile device of the user. In some implementations, the system presents the user interface in a web browser of the mobile device of the user. The system can generate and send one or more webpages that includes the aggregated information to the web browser of the mobile device of the user. In other implementations, the system presents the user interface to the mobile device of the user using a mobile device application or other method that conveys information to the user.

Figure 3:
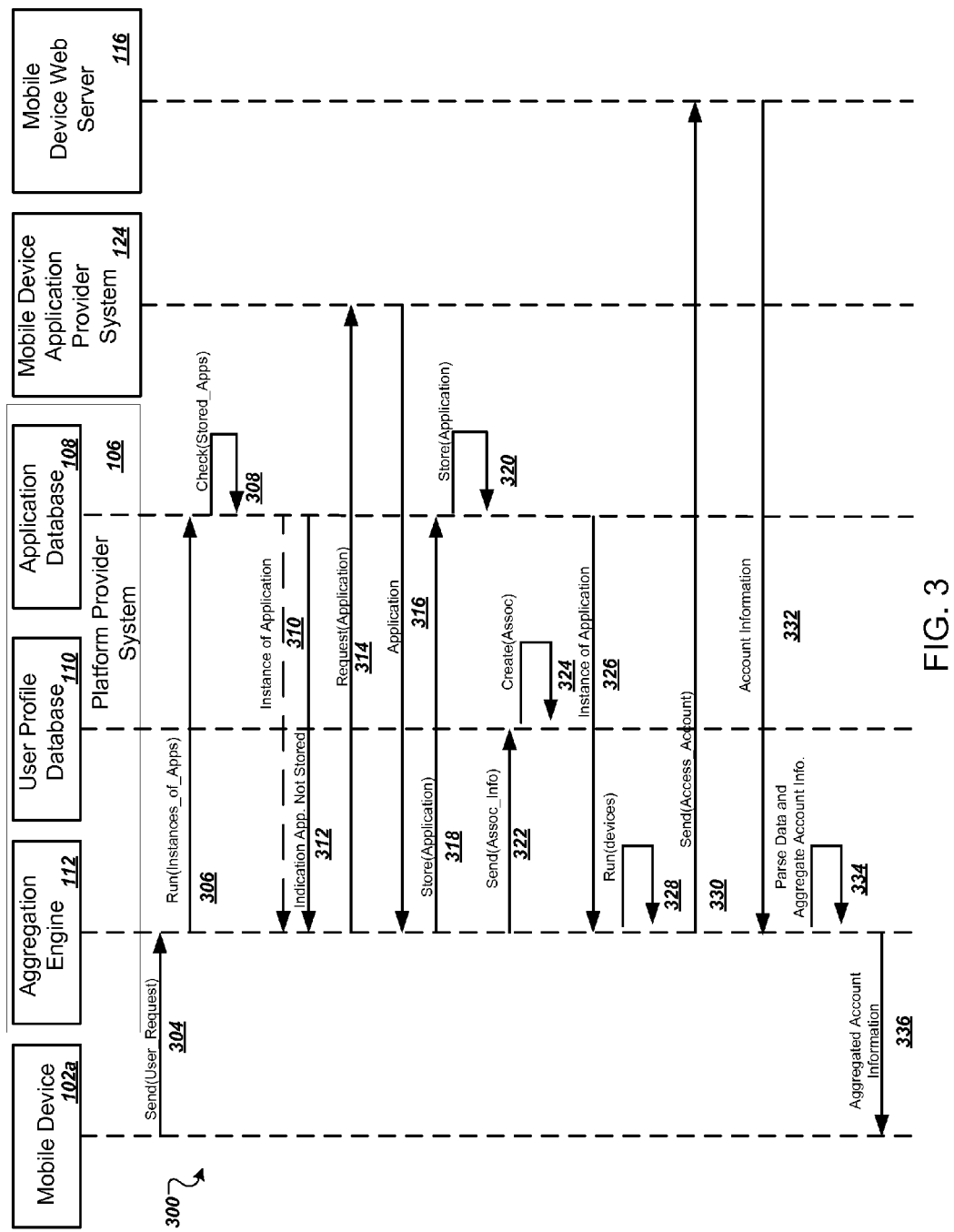
FIG. 3 is a data exchange sequence diagram of an example sequence of running an instance of a mobile device application.

FIG. 3 is a sequence diagram of an example sequence 300 of running an instance of a mobile device application of an establishment. The sequence 300 is performed by a system of one or more computers. For example, the account aggregation system 100 of FIG. 1, appropriately programmed, can perform the sequence 300.

The mobile device 102a sends a user request to the aggregation engine 112 of the platform provider system 106 to access account information at computer systems of different establishments (step 304). The aggregation engine 112 sends a request to the application database to run an instance of a mobile device application of each of the different establishments that the user identifies in the user request (step 306).

The application database 108 determines if the mobile device application of each of the different establishments is stored in the database by checking for the mobile device application (step 308). The application database 108 can be indexed based on the establishment. The application database 108 performs a search of the index to determine if a mobile device application for a particular establishment is stored in the database. The application database 108 can compare information identifying the particular establishment to an index of the mobile device applications stored in the repository. The index can include information associated with each mobile device application stored that identifies the particular establishment associated with the mobile device application. The information can be in the form of metadata. When the mobile device application of a requested establishment is stored in the application database 108, the application database 108 sends a response (step 310) to the aggregation engine 112 that indicates that the mobile device application of the particular establishment is stored in the application database 108. Otherwise, the application database 108 sends a response to the aggregation engine that indicates that the mobile device application of the particular establishment is not stored (step 312).

In response to receiving a response that indicates that a requested mobile device application is not available, the aggregation engine 112 sends a request for a mobile device application of the particular establishment (step 314) to the mobile device application provider system 124. The request includes information that describes the particular establishment that does not have a mobile device application stored in the application database. The mobile device application provider sends the mobile device application of the requested establishment (step 316) to the aggregation engine 112. The aggregation engine 112 can send the request across a network or over the Internet to the mobile device application provider system 124, and the mobile device application provider system 124 can send the requested mobile device application to the aggregation engine 112 across the network or the Internet. In other cases, aggregation engine 112 and the mobile device application provider system 124 are not connected across the network or Internet so the request for the mobile device application and the download of the mobile device application is done using a computer readable medium. For example, the platform provider system can receive the mobile device application from a media device, e.g., flash drive, compact disc, or laptop, that a system administrator loads onto the system or the system can receive the mobile device application by interacting through a network, e.g., the Internet, with a mobile device application provider. The application database 108 stores the one or more mobile device applications obtained from the mobile device application provider.

In response to receiving the mobile device application, the aggregation engine 112 provides the mobile device application to the application database 108 for storage (step 318). The application database 108 stores the mobile device application (step 320). The aggregation engine 112 sends information to the user profile database 110 that includes the establishment and the user establishment login credentials (step 322). The user profile database 110 creates an association between the user, the establishment, and the establishment login credentials of the user and stores the association (step 324). The application database 108 creates an instance of the mobile device application to load on the aggregation engine 112. The application database 108 provides to the aggregation engine 112 the instance of the mobile device application (step 326) The aggregation engine 112 instantiates virtual machines that run emulated devices that execute the mobile device applications of the establishments (step 328).

After the aggregation engine 112 instantiates the instance of the mobile device application, the aggregation engine 112 runs a script that sends commands to the mobile device web server 116 or application programming interface to access account information data (step 330). For example, the commands can navigate one or more mobile device webpages of the establishment computer system or the commands can interact directly with the mobile application programming interface of the establishment computer system to access account information of the user at the establishment. The mobile device web server 116 or application programming interface on the establishment computer system provides mobile device user interface screens that include account information data of the user to the aggregation engine 112 in response to the commands sent by the script (step 332). The sequence for generating a script to interact with an establishment computer system is described in more detail below with reference to FIG. 4.

In some implementations, the mobile device application provider system 124 can send an update notification of the mobile device application to the application database 108. The update notification can be an update of the mobile device application or an indication that an update of the mobile device application is available. The update notification can alert the platform provider system 106 that an update of the script and/or the mobile device application is needed.

The aggregation engine 112 parses the received data and aggregates the account information (step 334). The aggregation engine 112 provides to the mobile device 102a a user interface that includes the aggregated account information (step 336).

Figure 4:
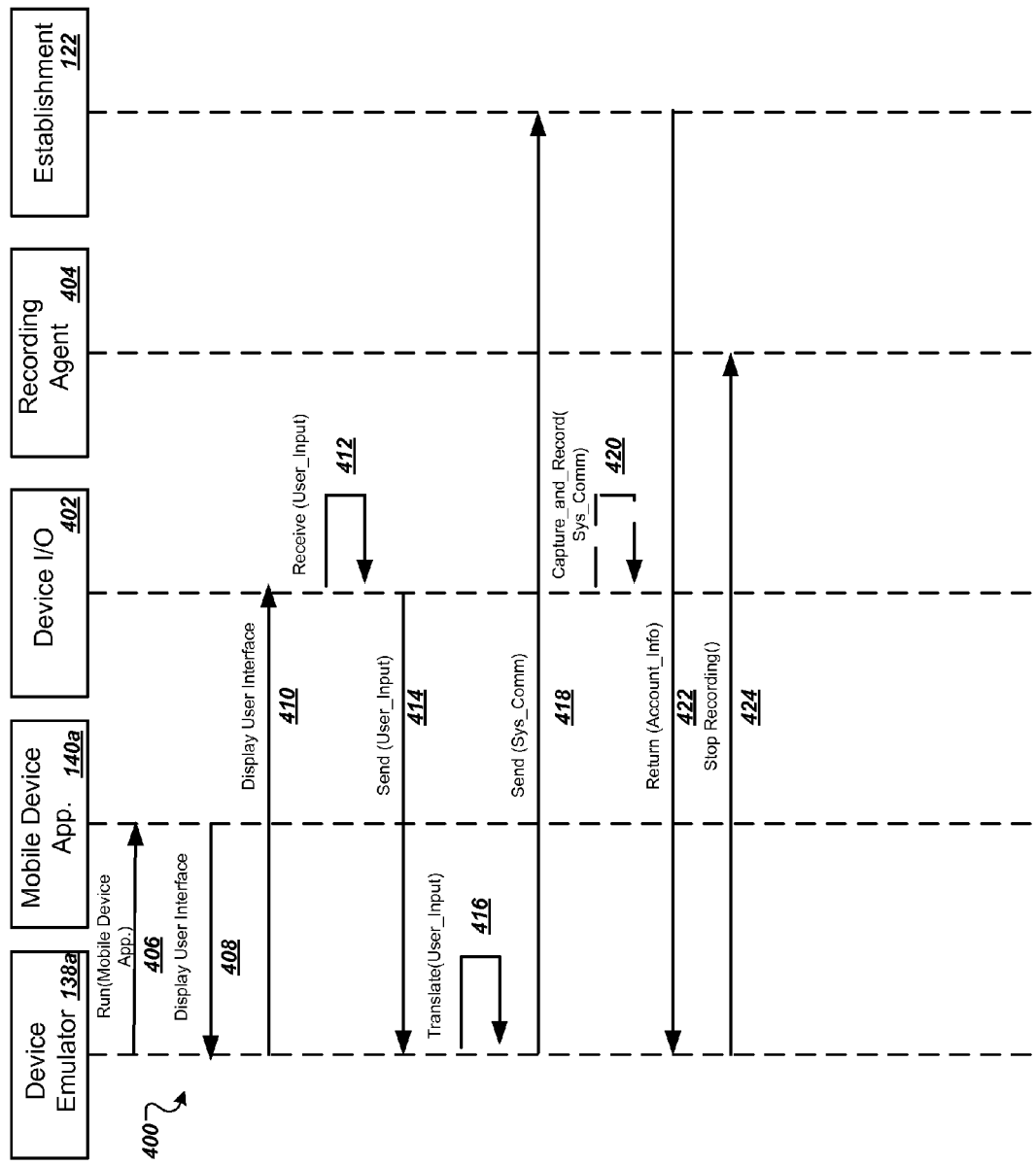
FIG. 4 is a data exchange sequence diagram of an example sequence for generating a script that interacts with the establishment computer system.

FIG. 4 is a sequence diagram of an example sequence 400 for generating a script that interacts with the establishment computer system to obtain account information of the user. The sequence 400 is performed by a system of one or more developer computers. For example, the developer computer 130 of FIG. 1, appropriately programmed, can perform the sequence 400.

The mobile device application 140a runs on a device emulator 138a that interacts with the developer's computer (step 406). The mobile device application 140a provides to the device emulator a display of a user interface (step 408). The device emulator 138a provides a user interface display to the device I/O 402 of the developer computer for display (step 410). The device I/O 402 receives user input (step 412). The device I/O 402 of the developer's computer sends user input to the device emulator 138a that represents triggering events (step 414). Triggering events include different user interactions that include gesture motions, e.g. tapping, swiping, tilting or movement of the mobile device application. The device emulator 138a translates the user input into system commands that represent triggering events (step 416). The device emulator 138a sends the system commands to the establishment computer system 122 through the device I/O 402 of the developer's computer (step 418). A recording agent 404 on the developer's computer captures the system command that is sent and records the command (step 420). In response to receiving the command, the establishment computer system 122 provides to the emulated device account information data of the user (step 422), e.g., on a mobile device webpage or in stream of data.

The recording agent 404 captures and records system commands from the device emulator 138a until the device emulator 138a sends a stop recording signal (step 424).

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what can be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A system, comprising:
   one or more computers;
   one or more storage device storing instructions that, when executed by the one or more computers, cause the one or more computers to perform operations comprising:
      receiving, at a server computer system from a mobile device of a user, a first user request to access account information from a plurality of establishments;
      receiving, at the server computer system from a provider computer system, a plurality of mobile device applications, each mobile device application associated with a respective establishment of the plurality of establishments;
      storing, at the server computer system, the plurality of mobile device applications;
      for each respective establishment of the plurality of establishments:
         storing, at the server computer system, establishment login credentials of the user to access account information of the user at a computer system of the respective establishment, and
         obtaining account information of the user at the respective establishment, by running the respective mobile device application of the respective establishment on the server computer system, and using the stored establishment login credentials of the user to access the computer system of the respective establishment;
      aggregating, on the computer system, all the account information of the user from the respective mobile device application of each establishment of the plurality of establishments; and providing to the mobile device the aggregated account information of the user.

2. The system of claim 1, wherein the first user request includes server login credentials of the user to access a respective user profile on the server computer system.

3. The system of claim 2, the operations further comprising:
associating, at the server computer system, the respective establishments with the respective user profile;
receiving, from the mobile device of the user, a second user request to access account information of the user for a new establishment, wherein the respective user profile does not include an association with the new establishment;
storing, at the server computer system, a mobile device application associated with the new establishment; and
associating, at the server computer system, the new establishment with the respective user profile.

4. The system of claim 1, wherein running the respective mobile device application further comprises:
running a script that corresponds to the respective mobile device application, wherein the script executes a plurality of events that causes the mobile device application to generate a mobile device webpage;
receiving the mobile device webpage from the computer system of the respective establishment; and
extracting information from the mobile device webpage of the respective establishment.

5. The system of claim 1, wherein the establishment login credentials include a user identifier and a token.

6. The system of claim 1, wherein the establishment is a financial institution the account information includes information describing scheduled payments, account balance, or past transactions of the user at the respective establishment.

7. The system of claim 1, wherein the account information of the user at the respective establishment includes information from multiple types of accounts of the user at the respective establishment.

8. The system of claim 1, wherein a user request includes a device ID that identifies the mobile device of the user to the server computer system.

9. A system, comprising:
one or more computers;
one or more storage device storing instructions that, when executed by the one or more computers, cause the one or more computers to perform operations comprising:
receiving, at a server computer system from a mobile device of a user, a first user request to access account information from a plurality of establishments;
receiving, at the server computer system from a provider computer system, a plurality of mobile device applications, each mobile device application associated with a respective establishment of the plurality of establishments;
storing, at the server computer system, the plurality of mobile device applications;
for each respective establishment of the plurality of establishments:
storing, at the server computer system, establishment login credentials of the user to access account information of the user at a computer system of the respective establishment, and
obtaining account information of the user at the respective establishment, by accessing a mobile application programming interface of the respective establishment, and using captured establishment login credentials of the user to access the computer system of the respective establishment;
aggregating, on the computer system, all the account information of the user from the plurality of establishments; and
providing to the mobile device the aggregated account information.

10. The system of claim 9, wherein obtaining account information of the user at the respective establishment does not require an agreement with the respective establishment to access the account information of the user.

11. The system of claim 9, wherein the operations further comprise:
receiving account data from the mobile application programming interface of the respective establishment including one or more types of account information of the user;
identifying the one or more types of account information from the account data; and
parsing from the account data the account information based on the one or more identified types of account information.

12. The system of claim 9, wherein the first user request includes server login credentials of the user to access a respective user profile on the server computer system.

13. The system of claim 12, wherein the operations further comprise:
associating, at the server computer system, the respective establishments of the plurality of mobile device applications with the respective user profile;
receiving, from the mobile device of the user, a subsequent user request to access account information of the user for a new establishment, wherein the respective user profile does not include an association with the new establishment;
storing, at the server computer system, a mobile device application associated with the new establishment; and
associating, at the server computer system, the new establishment with the respective user profile.

14. A system, comprising:
one or more computers;
one or more storage device storing instructions that, when executed by the one or more computers, cause the one or more computers to perform operations comprising:
receiving, at a server computer system from a mobile device of a user, establishment login credentials of the user to access account information of the user from an establishment;
storing, at the server computer system, a mobile device application that is associated with the establishment;
running, at the server computer system, the mobile device application of the establishment;
providing the mobile device application the establishment user login credentials;
capturing, from the mobile device application, a sequence of events within the mobile device application that include one or more triggering events within the mobile device application; and
generating a script that navigates the mobile device application of the establishment based on the sequence of events.

15. The system of claim 14, wherein the one or more triggering events include user interactions on the mobile device of the user, wherein the user interactions include gesture motions on the mobile device or motion of the mobile device by the user.

16. The system of claim 14, wherein the one or more triggering events include running a system command of an operating system of the mobile device.

17. The system of claim 14, wherein the sequence of events correspond to a navigation of one or more mobile device webpages of the establishment.

18. A system, comprising:
one or more computers;
one or more storage device storing instructions that, when executed by the one or more computers, cause the one or more computers to perform operations comprising:
storing, at a server computer system, a mobile device application associated with an establishment;
receiving, at the server computer system from a plurality of mobile devices, each mobile device associated with a respective user of a plurality of users, user requests to access account information for the plurality of users at the establishment;
running, at the server computer system, a plurality of instances of the mobile device application, wherein each instance of the mobile device application is associated with a respective mobile device of the plurality of mobile devices;
for each respective user of the plurality of users:
capturing, at the server computer system, establishment login credentials of the respective user to accesses account information of the respective user at a computer system of the establishment, and
obtaining account information for each respective user using the captured establishment login credentials of the respective user to access the computer system of the establishment; and
providing to the plurality of mobile devices, the account information of the respective user associated with the mobile device.

19. A non-transitory computer storage medium encoded with a computer program, the program comprising instructions that when executed by one or more computers cause the one or more computers to perform operations comprising:
receiving, at a server computer system from a mobile device of a user, a first user request to access account information from a plurality of establishments;
receiving, at the server computer system from a provider computer system, a plurality of mobile device applications, each mobile device application associated with a respective establishment of the plurality of establishments;
storing, at the server computer system, the plurality of mobile device applications;
for each respective establishment of the plurality of establishments:
storing, at the server computer system, establishment login credentials of the user to access account information of the user at a computer system of the respective establishment, and
obtaining account information of the user at the respective establishment, by running the respective mobile device application of the respective establishment on the server computer system, and using the stored establishment login credentials of the user to access the computer system of the respective establishment;
aggregating, on the computer system, all the account information of the user from the respective mobile device application of each establishment of the plurality of establishments; and
providing to the mobile device the aggregated account information of the user.

20. The non-transitory computer storage medium of claim 19, wherein the first user request includes server login credentials of the user to access a respective user profile on the server computer system.

21. The non-transitory computer storage medium of claim 20, the operations further comprising:
associating, at the server computer system, the respective establishments with the respective user profile;
receiving, from the mobile device of the user, a second user request to access account information of the user for a new establishment, wherein the respective user profile does not include an association with the new establishment;
storing, at the server computer system, a mobile device application associated with the new establishment; and
associating, at the server computer system, the new establishment with the respective user profile.

22. The non-transitory computer storage medium of claim 19, wherein running the respective mobile device application further comprises:
running a script that corresponds to the respective mobile device application, wherein the script executes a plurality of events that causes the mobile device application to generate a mobile device webpage;
receiving the mobile device webpage from the computer system of the respective establishment; and
extracting information from the mobile device webpage of the respective establishment.

23. The non-transitory computer storage medium of claim 19, wherein the establishment login credentials include a user identifier and a token.

24. The non-transitory computer storage medium of claim 19, wherein the establishment is a financial institution the account information includes information describing scheduled payments, account balance, or past transactions of the user at the respective establishment.

25. The non-transitory computer storage medium of claim 19, wherein the account information of the user at the respective establishment includes information from multiple types of accounts of the user at the respective establishment.

26. The non-transitory computer storage medium of claim 19, wherein a user request includes a device ID that identifies the mobile device of the user to the server computer system.

27. A non-transitory computer storage medium encoded with a computer program, the program comprising instructions that when executed by one or more computers cause the one or more computers to perform operations comprising:
receiving, at a server computer system from a mobile device of a user, a first user request to access account information from a plurality of establishments;
receiving, at the server computer system from a provider computer system, a plurality of mobile device applications, each mobile device application associated with a respective establishment of the plurality of establishments;
storing, at the server computer system, the plurality of mobile device applications;
for each respective establishment of the plurality of establishments:
storing, at the server computer system, establishment login credentials of the user to access account information of the user at a computer system of the respective establishment, and obtaining account information of the user at the respective establishment, by accessing a mobile application programming interface of the respective establishment, and using captured establishment login credentials of the user to access the computer system of the respective establishment;

aggregating, on the computer system, all the account information of the user from the plurality of establishments; and providing to the mobile device the aggregated account information.

28. The non-transitory computer storage medium of claim 27, wherein obtaining account information of the user at the respective establishment does not require an agreement with the respective establishment to access the account information of the user.

29. The non-transitory computer storage medium of claim 27, the operations further comprising:

receiving account data from the mobile application programming interface of the respective establishment including one or more types of account information of the user;

identifying the one or more types of account information from the account data; and parsing from the account data the account information based on the one or more identified types of account information.

30. The non-transitory computer storage medium of claim 27, wherein the first user request includes server login credentials of the user to access a respective user profile on the server computer system.

31. The non-transitory computer storage medium of claim 30, the operations further comprising:

associating, at the server computer system, the respective establishments of the plurality of mobile device applications with the respective user profile;

receiving, from the mobile device of the user, a subsequent user request to access account information of the user for a new establishment, wherein the respective user profile does not include an association with the new establishment;

storing, at the server computer system, a mobile device application associated with the new establishment; and associating, at the server computer system, the new establishment with the respective user profile.

32. A non-transitory computer storage medium encoded with a computer program, the program comprising instructions that when executed by one or more computers cause the one or more computers to perform operations comprising:

receiving, at a server computer system from a mobile device of a user, establishment login credentials of the user to access account information of the user from an establishment;

storing, at the server computer system, a mobile device application that is associated with the establishment;

running, at the server computer system, the mobile device application of the establishment;

providing the mobile device application the establishment user login credentials;

capturing, from the mobile device application, a sequence of events within the mobile device application that include one or more triggering events within the mobile device application; and generating a script that navigates the mobile device application of the establishment based on the sequence of events.

33. The non-transitory computer storage medium of claim 32, wherein the one or more triggering events include user interactions on the mobile device of the user, wherein the user interactions include gesture motions on the mobile device or motion of the mobile device by the user.

34. The non-transitory computer storage medium of claim 32, wherein the one or more triggering events include running a system command of an operating system of the mobile device.

35. The non-transitory computer storage medium of claim 32, wherein the sequence of events correspond to a navigation of one or more mobile device webpages of the establishment.

36. A non-transitory computer storage medium encoded with a computer program, the program comprising instructions that when executed by one or more computers cause the one or more computers to perform operations comprising:

storing, at a server computer system, a mobile device application associated with an establishment;

receiving, at the server computer system from a plurality of mobile devices, each mobile device associated with a respective user of a plurality of users, user requests to access account information for the plurality of users at the establishment;

running, at the server computer system, a plurality of instances of the mobile device application, wherein each instance of the mobile device application is associated with a respective mobile device of the plurality of mobile devices;

for each respective user of the plurality of users:
capturing, at the server computer system, establishment login credentials of the respective user to accesses account information of the respective user at a computer system of the establishment, and obtaining account information for each respective user using the captured establishment login credentials of the respective user to access the computer system of the establishment; and providing to the plurality of mobile devices, the account information of the respective user associated with the mobile device.

* * * * *